July 21, 1931.  J. H. SEARLES  1,815,216
SQUARE AND MITER ATTACHMENT FOR SAWS
Filed Oct. 26, 1929
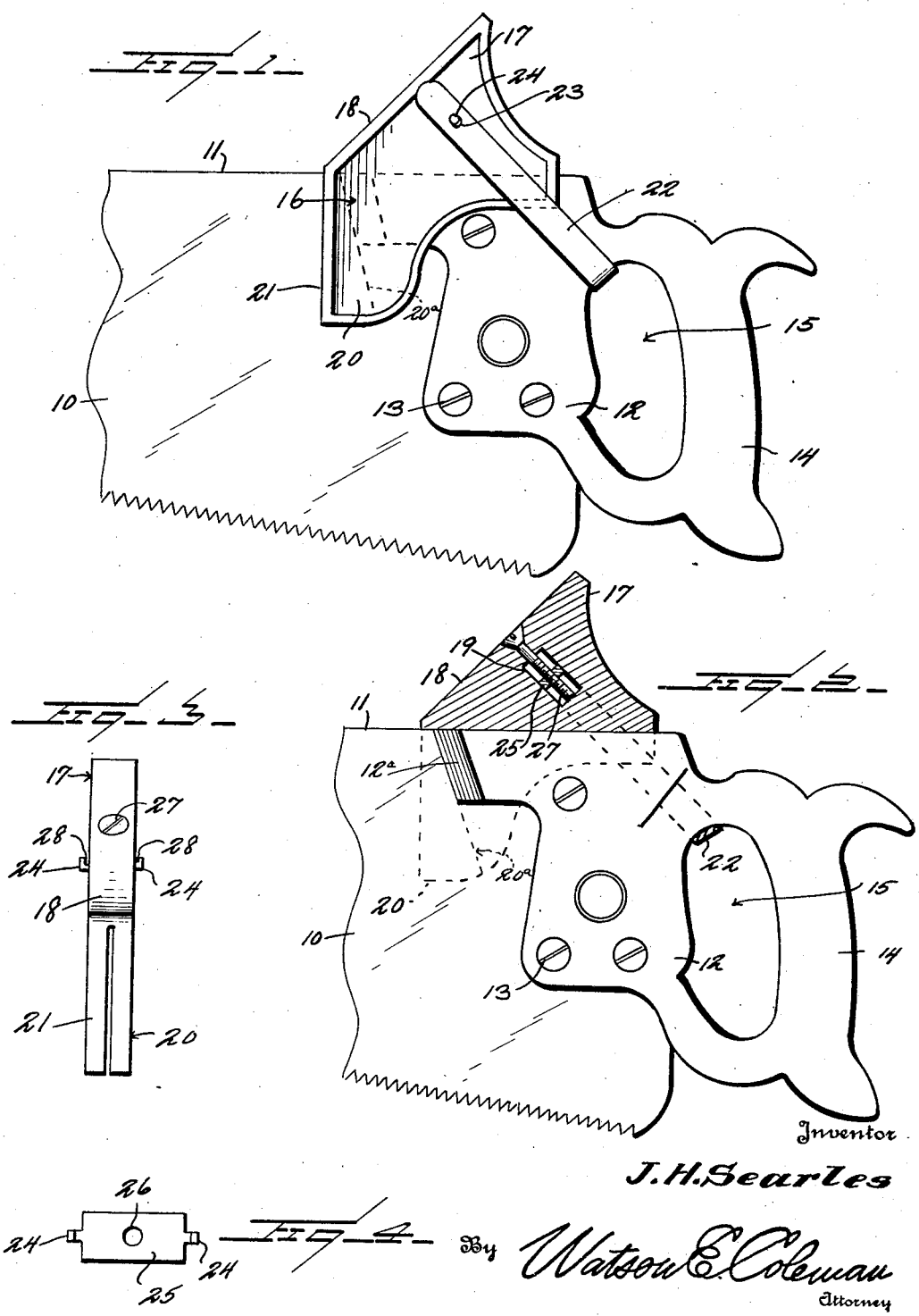
Inventor
J. H. Searles
By Watson E. Coleman
Attorney Patented July 21, 1931

1,815,216

UNITED STATES PATENT OFFICE

JOSEPH H. SEARLES, OF LOS ANGELES, CALIFORNIA

SQUARE AND MITER ATTACHMENT FOR SAWS

Application filed October 26, 1929. Serial No. 402,656.

The present invention relates to a combination square and miter attachment which may be removably secured to the back of a saw.

An object of this invention is to provide a device of this character which may be used in combination with a straight back saw and which may be removably secured to the present structure of the saw without in any way altering the structure.

Another object of this invention is to provide a device of this character which is not only light in weight, but of a proportionate size so that, if desired, it may be secured to the saw without providing a cumbersome structure which would limit the use of the saw while the structure was mounted thereon.

The above and various other objects and advantages of this invention will in part be described in and in part understod from the following detailed description of the present preferred embodiment, the same being illustrated in the accompanying drawings wherein:—

Fig. 1 is a detailed side elevation of a combination square and miter mounted on a saw.

Fig. 2 is a sectional view of the device.

Fig. 3 is a front elevation of the device, and

Fig. 4 is a detailed elevation of the securing lug.

Referring to the drawings, the numeral 10 designates a saw blade of conventional construction which is provided at the upper edge thereof with a straight edge 11. The saw blade 10 is provided with a handle 12 which is mounted on the blade 10 in the usual manner by use of screws 13 or the like, and the handle 12 is provided with a gripping member 14 which is adapted to be grasped in the hand of the operator. The handle 12 is provided with an opening 15 for passage of the fingers so as to provide a convenient gripping contact with the grasping portion 14.

A combination square and miter generally designated as 16 is removably secured to the back of the saw 10. A miter portion 17 of the device having an inclined forward edge 18 is mounted upon the upper edge of the saw and is adapted to extend upwardly and rearwardly from the straight edge 11. The miter edge 18 may be of any desired angle but in the present prefered embodiment this angle has been designated as 45°.

The miter portion 17 is provided with an angularly inclined opening 19 which extends through the miter edge 18. A bifurcated shank 20 extends downwardly from the body of the miter 17 and is adapted to engage the saw blade 10 therebetween. The forward edges 21 of the bifurcated shank 20 preferably extend downwardly from the straight edge 11 at an angle of 90° so as to form a square on each side of the saw blade.

The configuration of the rear portion of the bifurcated shank 20 preferably conforms to the configuration of the forward end of the saw handle 12, which is inclined rearwardly as at 20ª so as to frictionally engage the beveled forward end 12ª of the handle 12 thus locking the square 20 on the saw blade 11. A securing member or strap 22 is substantially U-shaped and is adatped to embrace the handle 12 through the opening 15. The open ends of the strap 22 are provided with openings 23 in which the outer end portions 24 of a securing lug 25 are adapted to engage. The securing lug 25 is provided with a threaded opening 26 for receiving a screw member 27. The screw member 27 extends downwardly through the miter face 18 of the miter 17 and engages the threaded opening of the lug 26 so that the miter may be removably secured to the back of the saw.

The outstanding lugs 24 are provided with hook portions 28 which engage the openings 23 in the strap. The opening 19 in the miter is preferably elongated so as to permit relative movement of the lug 25 therein, so that the miter may be securely fastened to the back of the saw.

In operation, the combination square and miter is removably secured to the back of the saw in the manner described and when it is desired to use the square portion of the device, the square edge 21 may be placed against the edge of the board or the like, and the back of the saw position so as to extend at an angle of 90° from the edge of the board. This angle will, of course, be immediately determined when the square edge 21 engages the straight edge of the board. When it is desired to use the mitered edge, the edge portion 18 of the miter is placed against the edge of the board and a line may be drawn along the back or straight edge 11 of the saw.

It will, of course, be understood that the combination square and miter may be constructed of any suitable material such as iron, aluminum, or the like, or it may be constructed of a combination of wood and metal, the body portion of the device, including the bifurcated shank, being constructed of wood and the square and miter edges being provided with metal portions secured to the body in any desired manner.

It will, of course, be understood that various changes and modifications may be made in the details of construction and design of the above specifically described embodiment of the invention without departing from the spirit thereof, such changes and modifications being restricted only by the scope of the following claims:—

I claim:—

1. A combination square and miter attachment adapted to be removably secured to a saw, said miter comprising a body portion and inclined forward edge, said body portion having an elongated opening therein adapted to receive a portion of the saw, a strap adapted to removably engage the handle of the saw for holding said attachment on said saw and means for securing the strap to the miter.

2. A square and miter attachment for a saw, the miter part having a rearwardly and downwardly inclined opening therethrough, a strap adapted to embrace the handle of the saw, a lug slidably mounted in said opening, said lug being adapted to engage said strap whereby to removably secure the miter to the saw.

3. A square and miter attachment for a saw comprising mitering means adapted to be removably mounted on the back of the saw, square means depending from said mitering means, said mitering means having a downwardly and rearwardly inclined opening therethrough, strap means for removably holding the mitering means to the back of the saw, said strap means comprising a substantially U-shaped strap having openings adjacent the free ends thereof, and adjustable securing means mounted in said opening of said miter for engaging the strap whereby to removably secure the miter to the saw.

In testimony whereof I hereunto affix my signature.

JOSEPH H. SEARLES.